United States Patent
Sato et al.

(10) Patent No.: US 9,014,392 B2
(45) Date of Patent: Apr. 21, 2015

(54) SYSTEM FOR INTRODUCING SOUND OUTSIDE VEHICLE

(71) Applicant: Murakami Corporation, Shizuoka (JP)

(72) Inventors: Hidenori Sato, Shizuoka (JP); Ayako Sugiyama, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 303 days.

(21) Appl. No.: 13/733,334

(22) Filed: Jan. 3, 2013

(65) Prior Publication Data

US 2013/0223643 A1     Aug. 29, 2013

(30) Foreign Application Priority Data

Feb. 29, 2012 (JP) .................. 2012-043103

(51) Int. Cl.
| | |
|---|---|
| H04B 1/00 | (2006.01) |
| G08B 3/10 | (2006.01) |
| B60Q 9/00 | (2006.01) |
| G08G 1/16 | (2006.01) |
| H04R 5/02 | (2006.01) |

(52) U.S. Cl.
CPC *G08B 3/10* (2013.01); *B60Q 9/008* (2013.01); *G08G 1/166* (2013.01)

(58) Field of Classification Search
USPC ............... 381/302, 122, 86, 365, 389
See application file for complete search history.

(56) References Cited

U.S. PATENT DOCUMENTS

| | | | |
|---|---|---|---|
| 2004/0202337 A1* | 10/2004 | Jun ............................. | 381/107 |
| 2013/0188794 A1* | 7/2013 | Kawamata et al. ........... | 381/56 |
| 2013/0338881 A1* | 12/2013 | Sato et al. .................... | 701/45 |

FOREIGN PATENT DOCUMENTS

| | | | |
|---|---|---|---|
| JP | 61-180836 U | | 11/1986 |
| JP | 8-2339 A | | 1/1996 |
| JP | 2009-113528 A | | 5/2009 |

\* cited by examiner

*Primary Examiner* — Paul S Kim
*Assistant Examiner* — Norman Yu
(74) *Attorney, Agent, or Firm* — Greenblum & Bernstein, P.L.C.

(57) ABSTRACT

Introduction of sounds outside a vehicle is automatically controlled according to a driving state of the vehicle. In a vehicle, a microphone device that collects sounds outside the vehicle and a speaker device that reproduces the collected sounds are installed. When a gear position for the vehicle is a reverse driving position, and until the vehicle reaches a predetermined speed for the first time after a key position in an ignition key switch is switched from an off position to an accessories position or an on position, the collected sounds are reproduced. The collected sounds are transmitted to a car navigation device or a car audio system via wires or wirelessly. When the sounds outside the vehicle are reproduced, sound reproduction in the car navigation device or the car audio system is stopped and the sounds outside the vehicle are reproduced at a set volume.

17 Claims, 5 Drawing Sheets

SYSTEM FOR INTRODUCING SOUND OUTSIDE VEHICLE

The disclosure of Japanese Patent Application No. JP2012-043103 filed on Feb. 29, 2012 including the specification, drawings, claims and abstract is incorporated herein by reference in its entirety.

BACKGROUND OF THE INVENTION

1. Field of the Invention

The present invention relates to a system for introducing a sound outside a vehicle, configured to, in order to safely drive a vehicle, collect a sound outside the vehicle via a microphone device arranged on the vehicle, introduce the collected sound into an interior of the vehicle and reproduce the collected sound via a speaker device, the system being configured to automatically control the introduction of the sound outside the vehicle according to the driving state of the vehicle.

2. Description of the Related Art

Examples of conventional systems for introducing a sound outside a vehicle are described in Japanese Utility Model Laid-Open No. 61-180836 and Japanese Patent Laid-Open Nos. 8-2339 and 2009-113528, which are described below. The system described in Japanese Utility Model Laid-Open No. 61-180836 is one configured to reproduce sounds outside a vehicle via a speaker upon a switch being turned on. The system described in Japanese Patent Laid-Open No. 8-2339 is one configured to, if a sound outside a vehicle corresponds to a sound registered in advance, reproduce the sound via a speaker device. The system described in Japanese Patent Laid-Open No. 2009-113528 is one configured to, if an illuminance detected by a sensor for illuminance outside the vehicle is equal to or below a threshold value set in advance or the vehicle is positioned within a residential area or within a set distance from the residential area, turn a microphone device on to reproduce sounds outside the vehicle via a speaker device.

The system described in Japanese Utility Model Laid-Open No. 61-180836 requires the driver to operate the switch in order to introduce sounds outside the vehicle, and such operation is troublesome. Meanwhile, with the systems described in Japanese Patent Laid-Open Nos. 8-2339 and 2009-113528, introduction of sounds outside the vehicle can automatically be controlled according to the state outside the vehicle. However, with the system described in Japanese Patent Laid-Open No. 8-2339, sounds outside the vehicle cannot be reproduced via the speaker device unless the sounds correspond to sounds registered in advance. Also, with the system described in Japanese Patent Laid-Open No. 2009-113528, sounds outside the vehicle cannot be reproduced via the speaker device unless an illuminance detected by the sensor for illuminance outside the vehicle is equal to or below a threshold value set in advance or the vehicle is positioned within a residential area or within a set distance from the residential area.

The present invention is intended to solve the aforementioned problems in the conventional techniques and provide a system for introducing a sound outside a vehicle, configured to automatically control introduction of sounds outside a vehicle according to a driving state of the vehicle.

SUMMARY OF THE INVENTION

The present invention includes: a microphone device installed outside an interior of a vehicle, the microphone device collecting a sound outside the vehicle; a speaker device installed inside the interior of the vehicle; a sound reproduction system that reproduces the sound collected by the microphone device, via the speaker device; and a sound reproduction control device that receives an input of a signal indicating a gear position currently selected for the vehicle, and controls the sound reproduction system so that if the gear position is a reverse driving position, the sound collected by the microphone device is reproduced via the speaker device, and if the gear position is a forward driving position, the reproduction of the sound collected by the microphone device is stopped or a volume of the sound reproduced is reduced to be smaller than that for reverse driving. For example, when a vehicle is backed out of a garage into a road with poor visibility, the driver is less likely to notice other vehicles running on the road and pedestrians on the sidewalks. According to the present invention, introduction of sounds outside a vehicle into the interior of the vehicle at the time of the vehicle being backed during which an accident is highly likely to occur like in the aforementioned situation enables the driver to hear, e.g., sounds of other vehicles running on the road and/or honking of horns from the other vehicles, and/or voices of pedestrians walking on the sidewalks, enabling enhancement in safety of reverse driving.

In the present invention, it is possible that the sound reproduction control device further receives an input of a key position signal indicating a key position in an ignition key switch in the vehicle and an input of a vehicle speed signal indicating a vehicle speed of the vehicle, and performs the control of the sound reproduction system so that until the vehicle speed reaches a predetermined speed for a first time after the key position in the ignition key switch is switched from an off position to an accessories position or an on position, the sound collected by the microphone device is reproduced via the speaker device even if the gear position is the forward driving position, and if the vehicle speed reaches the predetermined speed, the reproduction of the sound is stopped or the volume of the sound reproduced is reduced to be smaller than that before the vehicle speed reaches the predetermined speed for the first time, and even if the vehicle speed is subsequently decreased to be lower than the predetermined speed, the stoppage of the reproduction of the sound or the reduced volume of the sound reproduced is maintained. For example, when a parent drives a vehicle out of his/her house to go out, his/her child sometimes goes out to see him/her off. In such case, if the parent starts the vehicle without noticing the child, there is a risk of an accident. As described above, when a vehicle starts running immediately after the start of the engine, there is a higher risk of an accident compared to other cases of low speed runs (cases where the vehicle starts after a wait at a red traffic light or a traffic jam). According to the present invention, introduction of sounds outside a vehicle into the interior of the vehicle when the vehicle starts running immediately after the start of the engine enables the driver to hear, e.g., voices of people around the vehicle, and thus, the safety during the vehicle starts running immediately after the start of the engine can be enhanced. Furthermore, once the vehicle starts running and reaches a predetermined speed, even if the vehicle subsequently stops for a wait at a red traffic light or a traffic jam, sounds outside the vehicle are not introduced (or not introduced so large as those introduced at the time of the start of the engine), and thus, introduction of sounds outside the vehicle (or large introduction of sounds outside the vehicle such as that at the time of the start of the engine) in every wait at a stop signal or a traffic jam can be prevented, whereby the passengers are free from a feeling of inconvenience.

In the present invention, it is possible that: for example, a reverse signal indicating that the gear position is the reverse driving position is used as the gear position signal; and when the reverse signal is not input, the sound reproduction control device performs the control for a case where the gear position is the forward driving position.

In the present invention, it is possible that: for example, the sound reproduction system is used also as a sound reproduction system for a car audio system or a car navigation device; and the sound reproduction control device performs the control of the sound reproduction system so that when the sound collected by the microphone device is reproduced via the speaker device, reproduction of a sound from a sound source other than the sound outside the vehicle is stopped or a volume of the sound reproduced from the sound source other than the sound outside the vehicle is reduced.

In the present invention, it is possible that: for example, the microphone device includes a microphone amplifier having an automatic gain control function; and the sound reproduction control device performs the control of the sound reproduction system so that when the sound collected by the microphone device is reproduced via the speaker device, a signal of the sound output from the microphone amplifier is reproduced at a volume setting value determined in advance irrespective of a state of volume adjustment for the car audio system or the car navigation device immediately before the reproduction of the sound. Furthermore, it is possible that the sound reproduction control device performs control so that when a power supply of the car audio system or the car navigation device is off, if the sound collected by the microphone device should be reproduced via the speaker device, the power supply of the car audio system or the car navigation device is forcibly turned on. Also, it is possible that the microphone device includes a microphone amplifier including a filter that limits a pass-band width.

In the present invention, it is possible that the sound reproduction control device further receives an input of a window open/closed state signal indicating an open/closed state of a window of the vehicle, and performs the control of the sound reproduction system so that when the sound collected by the microphone device is reproduced via the speaker device, if the window of the vehicle is open, the sound is reproduced at a volume reduced compared to that for a case where the window is closed. Also, it is possible that the microphone device wirelessly transmits a collected-sound signal from the microphone device to a device including the sound reproduction system, using wireless communication according to a Bluetooth (registered trademark) hands-free profile. In this case, it is possible that if the device including the sound reproduction system is a car navigation device, the car navigation device forms a single SCO (synchronous connection-oriented) link with a mobile phone and a microphone device alternately switched. Consequently, even if a plurality of SCO links cannot be formed because of a problem in, e.g., resources in a car navigation device, a hands-free telephone communication between a mobile phone and the car navigation device and wireless transmission of a microphone-collected sound signal between a microphone device and the car navigation device can be performed. In this case, it is possible that the car navigation device, when a hands-free telephone communication with the mobile phone is performed, maintains the SCO link with the mobile phone until end of the hands-free telephone communication, when a collected-sound signal is received from the microphone device, maintains the SCO link with the microphone device until end of the reception of collected-sound signal, and when neither the hands-free telephone communication nor the reception of the collected-sound signal is performed, periodically performs the alternate SCO link switching.

The present invention includes: a microphone device installed outside an interior of the vehicle, the microphone device collecting the sound outside the vehicle; a speaker device installed inside the interior of the vehicle; a sound reproduction system that reproduces the sound collected by the microphone device, via the speaker device; and a sound reproduction control device that receives an input of a key position signal indicating a key position in an ignition key switch in the vehicle and an input of a vehicle speed signal indicating a vehicle speed of the vehicle, and performs control of the sound reproduction system so that until the vehicle speed reaches a predetermined speed for a first time after the key position in the ignition key switch is switched from an off position to an accessories position or an on position, the sound collected by the microphone device is reproduced via the speaker device, and if the vehicle speed reaches the predetermined speed, the reproduction of the sound is stopped or a volume of the sound reproduced is reduced to be smaller than that before the vehicle speed reaches the predetermined speed for the first time, and even if the vehicle speed is subsequently decreased to be lower than the predetermined speed, the stoppage of the reproduction of the sound or the reduced volume of the sound reproduced is maintained.

DETAILED DESCRIPTION OF THE PREFERRED EMBODIMENTS

Embodiments of the present invention will be described below.

Embodiment 1

Figure 2:
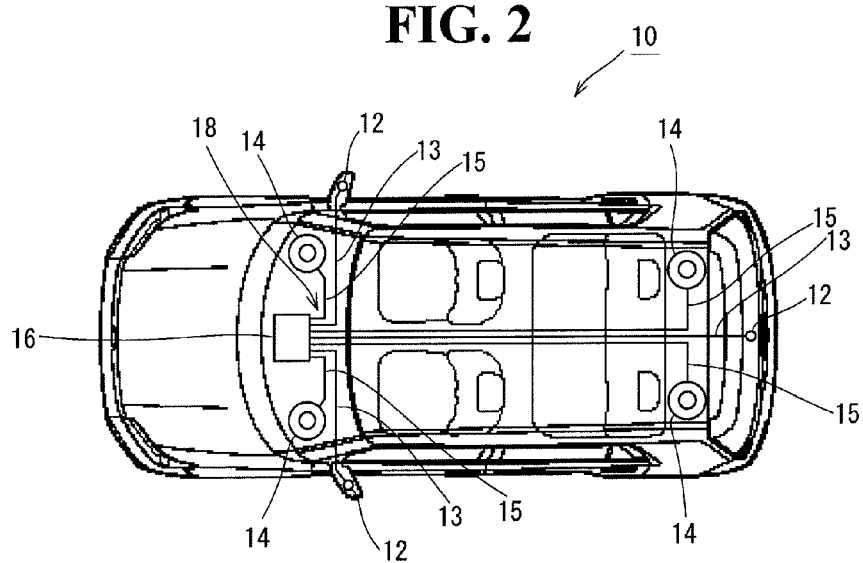
FIG. 2 is a plan diagram illustrating an example of arrangement of microphone devices, speaker devices and a body unit (device including a sound reproduction system) of a car navigation device in a vehicle according to embodiment 1 of the present invention.

FIG. 2 illustrates an example of arrangement of microphone devices, speaker devices and a device including a sound reproduction system in a vehicle, according to an embodiment of the present invention. Outside an interior of the vehicle 10, a proper number of microphone devices 12 are installed. Inside the interior of the vehicle 10, a proper number of speaker devices 14 are installed. In the example in FIG.

2, a microphone device 12 is installed at each of three positions, i.e., a rear portion of the vehicle and left and right door mirrors, and a speaker device 14 is installed at each of four positions, left and right portions on the front side and left and right portions on the rear side in the interior of the vehicle. The microphone device 12 at the rear portion of the vehicle can be arranged in such a manner that the microphone device 12 is held in, for example, a gap in a shield rubber between a hatchback door of the rear portion of the vehicle and a body or a gap in a shield rubber between a trunk lid and the body. At a proper position inside the interior (for example, a dashboard at a front portion in the interior), a body unit of a car navigation device (hereinafter "car navigation body unit") 16 is installed. The car navigation body unit 16 and the microphone devices 12 are mutually connected via microphone cables 13 laid in the vehicle 10. The car navigation body unit 16 and the speaker devices 14 are mutually connected via speaker cables 15 laid in the vehicle 10. The car navigation body unit 16 has a car navigation function and a car audio (e.g., radio, television, CD and DVD) reproduction function, and reproduces sounds from the car navigation function via, for example, two speaker devices 14 at the front left and right portions, and reproduces sounds from the car audio reproduction function in stereo in the four speaker devices 14 on all of the four sides. Collected-sound signals of sounds outside the vehicle, which are collected by the three microphone devices 12, are transmitted to the car navigation body unit 16 via the microphone cables 13. The car navigation body unit 16 subjects the collected-sound signals to proper signal processing and supplies the resulting collected-sound signals to the four speaker devices 14 using a sound reproduction system for the car navigation function and the car audio reproduction function, and reproduces the sounds outside the vehicle in stereo from the four speaker devices 14 on all of the four sides. In other words, for example, sounds collected by the microphone devices 12 and 12 at the positions on the left and right door mirrors are reproduced via the speaker devices 14 and 14 on the front left and right sides, respectively, and a sound collected by the microphone device 12 at a position in the rear portion of the vehicle is reproduced via both of the speaker devices 14 on the rear left and right sides. Consequently, it is possible to hear the sounds outside the vehicle while feeling which directions the sounds outside the vehicle come from.

Figure 3:
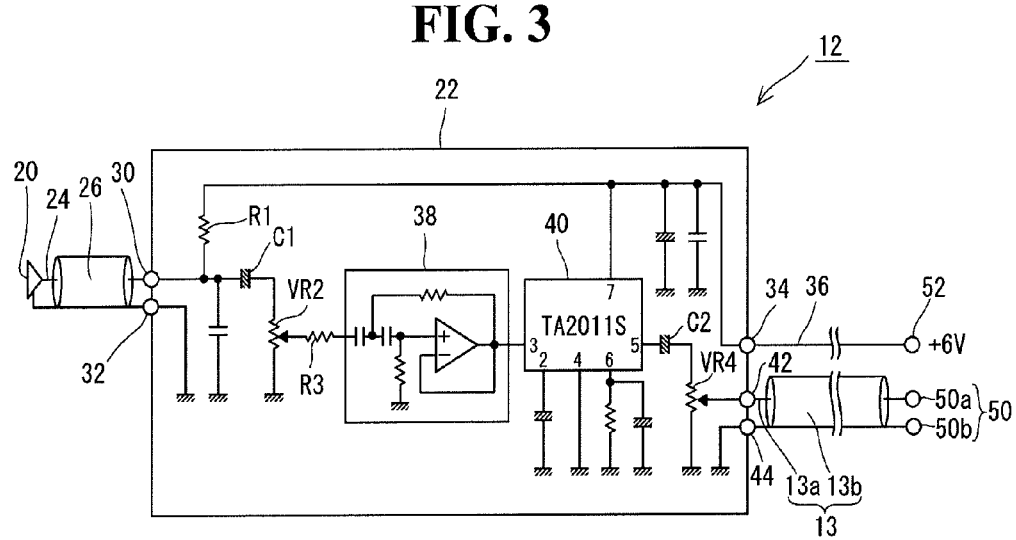
FIG. 3 is a circuit diagram illustrating an example configuration of a microphone device 12, which is illustrated in FIGS. 1 and 2.

FIG. 3 illustrates an example configuration of a microphone device 12. This example indicates a case where a microphone 20 is formed of a capacitor microphone. The microphone device 12 is formed by holding the microphone 20 and a microphone amplifier 22 in a water-proof structure (not illustrated) for unitization and making a diaphragm of the microphone 20 be exposed to the air. A signal wire 24 is connected to a back plate of the microphone 20 and a shielded wire 26 is connected to the diaphragm. The signal wire 24 is covered by the shielded wire 26. The signal wire 24 is connected to an AF (audio frequency) input terminal 30 of the microphone amplifier 22, and the shielded wire 26 is connected to an AF input ground terminal 32 of the microphone amplifier 22. An end portion of a power supply wire 36 for supplying power of +6 V from the car navigation body unit 16 is connected to a power supply terminal 34 of the microphone amplifier 22. A bias voltage is applied between the back plate and the diaphragm of the microphone 20 via a resistance R1 from the power supply wire 36. A direct-current voltage in a microphone-collected sound signal input from the input terminal 30 is cut in a capacitor C1, and the resulting microphone-collected sound signal is subjected to signal level adjustment in a semi-fixed resistance VR2 and a resistance R3 and input to a filter circuit 38. The filter circuit 38 cuts low frequency (for example, 200 Hz or lower) and high frequency (for example, 4000 Hz or higher) components, which are unwanted for sounds outside the vehicle to be introduced into the interior of the vehicle for safe driving, from a sound signal. Cutting components of 200 Hz or lower enables human voices outside the vehicle to be easily heard even at a place where there is a low frequency sound source such as fans in a outdoor unit of an air-conditioner. An output signal from the filter circuit 38 is input to an AGC (automatic gain control)-provided microphone amplifier IC 40. The microphone amplifier IC 40 evens out the level of a sound signal by means of its own AGC function to suppress distortion of a reproduced sound for a large sound outside the vehicle and pick up a sound well for a small sound outside the vehicle. FIG. 3 illustrates a case where "TA2011S", which is an IC manufactured by Toshiba Corporation, is used as the microphone amplifier IC 40. An output signal from the microphone amplifier IC 40 is subjected to direct-current component cutting in a capacitor C2, subjected to signal level adjustment in a semi-fixed resistance VR3 and output from an AF output terminal 42. An end of a signal wire 13a and an end of a shielded wire 13b, which are included in a microphone cable 13, are respectively connected to the AF output terminal 42 and an AF output ground terminal 44. The signal wire 13a is covered by the shielded wire 13b. The signal wire 13a and the shielded wire 13b are laid from a position where the microphone device 12 is installed to the car navigation body unit 16 in the body of the vehicle, and the respective other ends of the wires 13a and 13b are connected to microphone terminals 50a and 50b (microphone terminal 50 in FIG. 1) of the car navigation body unit 16, respectively. The power supply wire 36 is also laid from the position where the microphone device 12 is installed to the car navigation body unit 16 in the body of the vehicle, and the other end portion of the power supply wire 36 is connected to a microphone power supply terminal 52 (not illustrated in FIG. 1) of the car navigation body unit 16.

Figure 1:
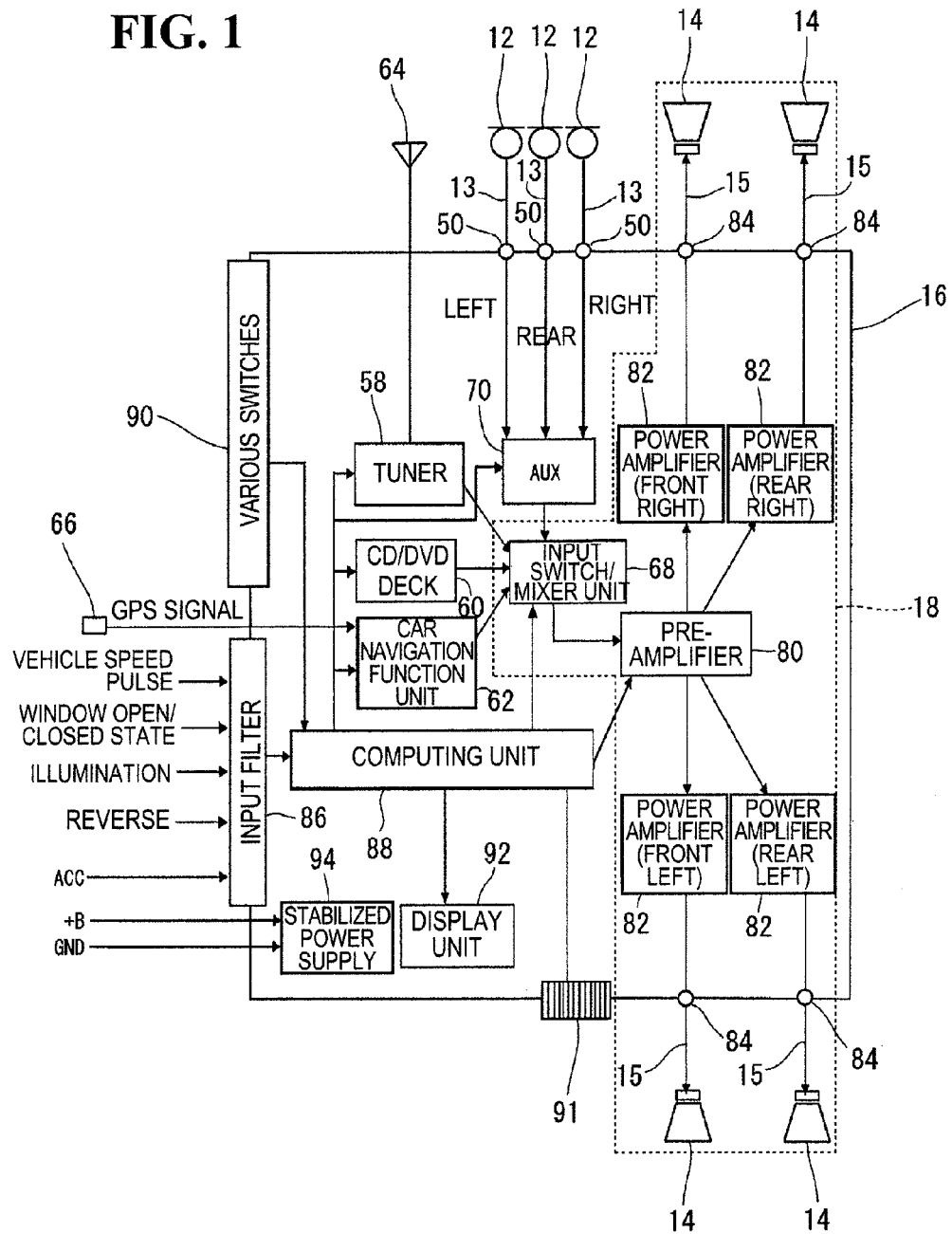
FIG. 1 is a block diagram illustrating an example configuration of a car navigation body unit 16, which is illustrated in FIG. 2.

FIG. 1 illustrates an example configuration of the car navigation body unit 16. The dotted parts 18 form a sound reproduction system shared between the car navigation device and the microphone device 12. Illustration of an image reproduction system for the car navigation device is omitted. The car navigation body unit 16 includes various types of source devices such as a tuner (AM/FM radio) 58, a CD/DVD deck 60 and a car navigation function unit (vehicle guidance system unit) 62. A signal received by an antenna 64 is supplied to the tuner 58. A signal received by a GPS antenna 66 is supplied to the car navigation function unit 62. Sound signals output from the tuner 58, the CD/DVD deck 60 and the car navigation function unit 62 are input to an input switch/mixer unit 68. Collected-sound signals of sounds outside the vehicle input from the respective microphone terminals 50 are also input to the input switch/mixer unit 68 via an AUX (auxiliary) input unit 70 as one of sound sources. The input switch/mixer unit 68 performs control for, e.g., switching of a sound source to another based on a source switching operation by an operator, automatic reproduction of a microphone-collected sound signal or mixing of the microphone-collected sound signal with a sound signal from another sound source according to a driving state of the vehicle, sound volume adjustment based on a sound volume adjustment operation by an operator and automatic sound volume adjustment during reproduction of the microphone-collected sound signal, based on instructions from a computing unit 88. The sound signals selected (or selected and mixed with a sound signal from another sound source) by the input switch/mixer unit 68 are guided to respective speaker output terminals 84 in respective (front left, front right, rear left and rear right) channels via a preamplifier 80 and respective power amplifiers 82 in the respective channels. The speaker devices 14 in the respective channels are connected to the respective speaker output terminals 84 via the respective speaker cables 15. The speaker devices 14 reproduce the respective sound signals guided to the respective speaker output terminals 84.

Following signals and power supplies are input to the car navigation body unit 16.

Vehicle speed pulse signal: Output pulse signal (vehicle speed signal) from a vehicle speed sensor that generates a pulse every time tires of the vehicle 10 rotate by a predetermined angle.

Window open/closed state signal: a signal that exhibits 0 V where all of the windows of the vehicle 10 are closed and +12 V (battery voltage) where any of the windows is open.

Illumination power supply: a power supply that exhibits +12 V where a light switch is at a width indicators position or a headlights position and exhibits 0 V where the light switch is at an off position.

Reverse signal: a signal that exhibits +12 V where the gear position is a reverse driving position and exhibits 0 V where the gear position is a position other than the reverse driving position.

ACC power supply: a power supply that exhibits +12 V where the key position in an ignition key switch is an ACC (accessories) position or an on position and exhibits 0 V where the key position is a position other than the ACC position and the on position.

The aforementioned signals and power supplies are input to an input filter 86, and the input filter 86 notifies the computing unit 88 of the states of the signals and the power supplies. The car navigation body unit 16 includes various switches 90 and a reproduction sound volume control 91 for an operator such as a driver to operate the car navigation body unit 16. The computing unit 88 controls various units in the car navigation body unit 16 according to, e.g., the states of the aforementioned signals and power supplies and the operations of various switches 90 and the reproduction sound volume control 91. A display unit 92 displays, e.g., a map in the car navigation function, an image from a rear camera and a touch panel for various input operations. A stabilized power supply 94, which is connected between a +B power supply (power supply of consistently +12 V) and GND (of consistently an earth potential), creates a power supply for driving the respective units in the car navigation body unit 16 from the +B power supply. A bias voltage in each microphone device 12 is also supplied from the stabilized power supply 94.

Figure 4:
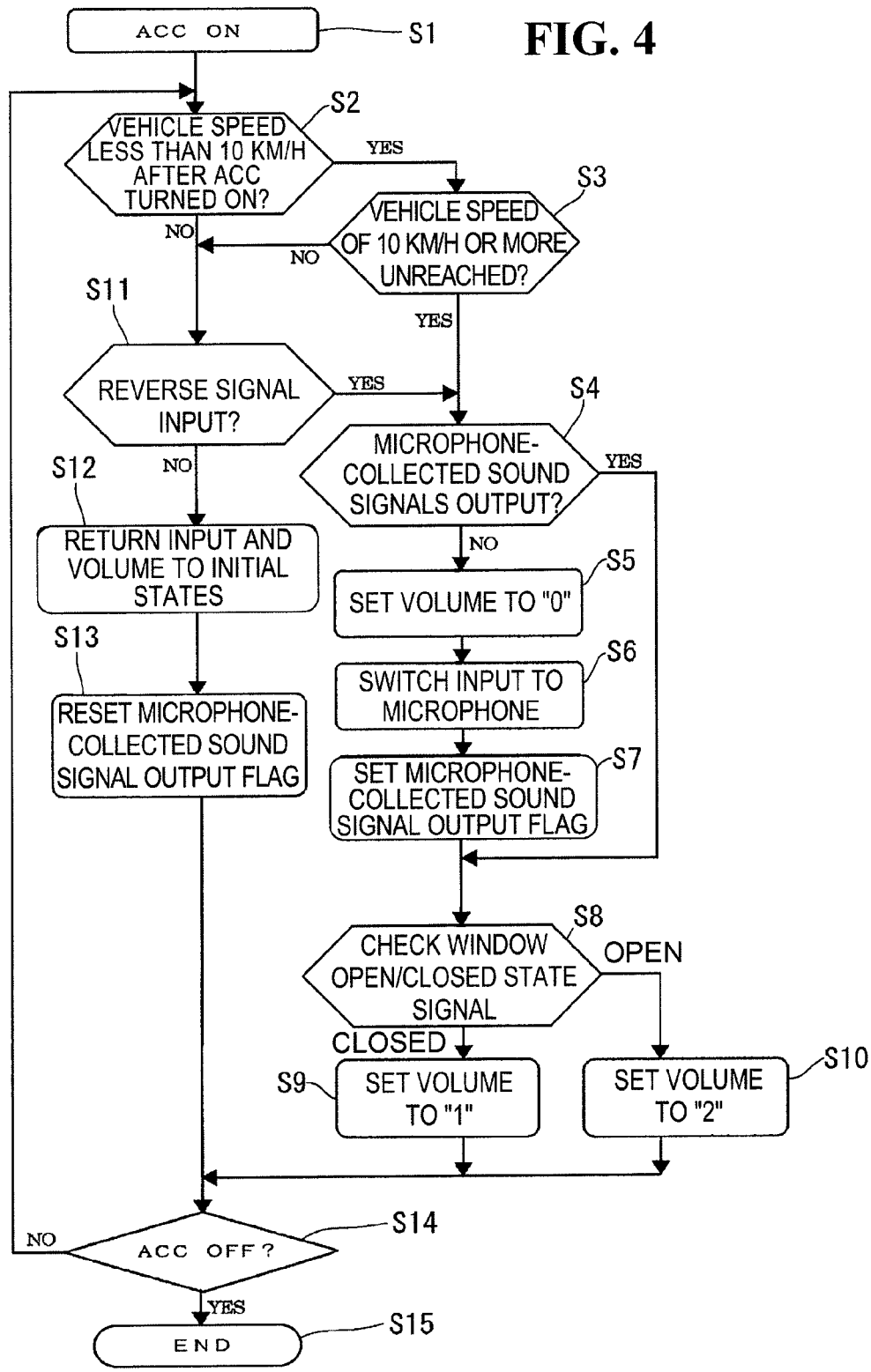
FIG. 4 is a flowchart illustrating control for reproduction of a microphone-collected sound signal by a computing unit 88 (sound reproduction control device), which is illustrated in FIG. 1.

Control of reproduction of a microphone-collected sound signal by the computing unit 88 will be described with reference to FIG. 4. The control illustrated in FIG. 4 is repeatedly performed during an ACC power supply being on. When the key position in the ignition key switch is switched from the off position to the ACC position or the on position to turn the ACC power supply on (S1), pulses of the vehicle speed pulse signal are counted to detect the vehicle speed. If the detected vehicle speed is, for example, less than 10 km/h ("YES" in S2) and has never reached 10 km/h or more after the ACC power supply being turned on ("YES" in S3), the computing unit 88 controls the input switch/mixer unit 68 to automatically set a reproduction volume level of microphone-collected sound signals to "0" (minimum value, that is, no sound or a minute level of sound) (S5 through "NO" in S4), switches the input source from an input source selected until then to microphone-collected sound signals (S6), and sets a microphone-collected sound signal output flag indicating that the input source has been switched to the microphone-collected sound signals (S7). Alternatively, where a power supply of the car navigation body unit 16 is off until then, the power supply is forcibly turned on, and the input source is set to microphone-collected sound signals in the same manner as described above ("NO" in S4, and S5, S6 and S7). Next, the window-open/closed state signal is checked, and if it is determined that all the windows are closed ("CLOSED" in S8) and the volume level is automatically switched to "1" (sound volume setting value at which sounds outside the vehicle can reliably be heard) (S9). Meanwhile, if it is determined that any of the windows is open ("OPEN" in S8), the volume level is automatically switched to "2" (sound volume setting value lower than level 1, at which sounds outside the vehicle can be heard without acoustic feedback) (S10). Consequently, sounds outside the vehicle, which are collected by the three microphone devices 12, are reproduced via the four speaker devices 14 in stereo in a proper sound volume, enabling a driver to hear sounds such as voices of people outside the vehicle with knowing directions from which the sounds come. Accordingly, the driver can start driving ensuring the safety immediately after the start of the engine.

When the vehicle speed reaches 10 km/h or more after the vehicle 10 starts running ("NO" in S2 and "NO" in S11), the input source and the sound volume are returned to their respective initial states (the states before switching of the input source to the microphones) (S12), and the microphone-collected sound signal output flag is reset (S13). Consequently, the reproduction of the microphone-collected sound signals is stopped, and sounds from, e.g., the car radio, are reproduced. Alternatively, if the power supply of the car navigation body unit 16 was initially off, the power supply is forcibly turned off. Even if the vehicle speed is subsequently lowered to less than 10 km/h because of, e.g., a wait at a red traffic light or a traffic jam ("YES" in S2), the vehicle speed has already reached 10 km/h or more in the past ("NO" in S3), and thus, no switching of the input source is performed. Accordingly, the inconvenience of switching the input source to the microphone-collected sound signals in every wait at a red traffic light or every traffic jam can be prevented.

Subsequently, when the vehicle reaches the destination and the gear position is shifted to the reverse driving position in order to enter a parking space in, e.g., a parking lot ("YES" in S11), the input source is switched from the input source selected until then to the microphone-collected sound signals ("NO" in S4, and S5, S6 and S7). Alternatively, if the power supply of the car navigation body unit 16 is off until then, the power supply is forcibly turned on, and the input source is set to the microphone-collected sound signals in the same manner as described above ("NO" in S4, and S5, S6 and S7). Consequently, the sounds collected by the three microphone devices 12 are reproduced via the four speaker devices 14 in stereo in a proper sound volume according to the open/closed state of the windows (S8 to S10), enabling the driver to hear sounds such as voices of people outside the vehicle with knowing directions from which the sounds come. Accordingly, the driver can park the vehicle in the parking space by driving the vehicle in reverse while ensuring the safety. When the vehicle has completely pulled into the parking space and the gear position is shifted from the reverse driving position to another position ("NO" in S11), the input source and the sound volume are returned to their respective initial states (states before switching of the input sources to the microphones) (S12), and the microphone-collected sound signal output flag is reset (S13). Consequently, the reproduction of the microphone-collected sound signals is stopped, and sounds from, e.g., the car radio, are reproduced. Alternatively, if the power supply of the car navigation body unit 16 was initially off, the power supply is forcibly turned off. Subsequently, if the key position in the ignition key switch is switched to the off position (S14), the control is ended (S15). Although in the control in FIG. 4, the input source is completely switched from the input source selected until then to the microphone-collected sound signals when the vehicle starts running or is driven in reverse, instead of complete switching, it is also possible to reduce the volume of the sounds from the input source selected until then, mix the sounds with the microphone-collected sound signals and reproduce the resulting sounds via the speaker devices 14. Furthermore, it is also possible to mix sound signals from the selected input source with the microphone-collected sound signals with the volume of the microphone-collected sound signals reduced to reproduce the resulting sounds during time other than the time when the vehicle starts running or is driven in reverse. Furthermore, it is possible to provide a microphone on/off switch to manually turn on/off the microphone-collected sound signals in addition to automatic turning on/off of the microphone-collected sound signals as described above.

Embodiment 2

Figure 5:
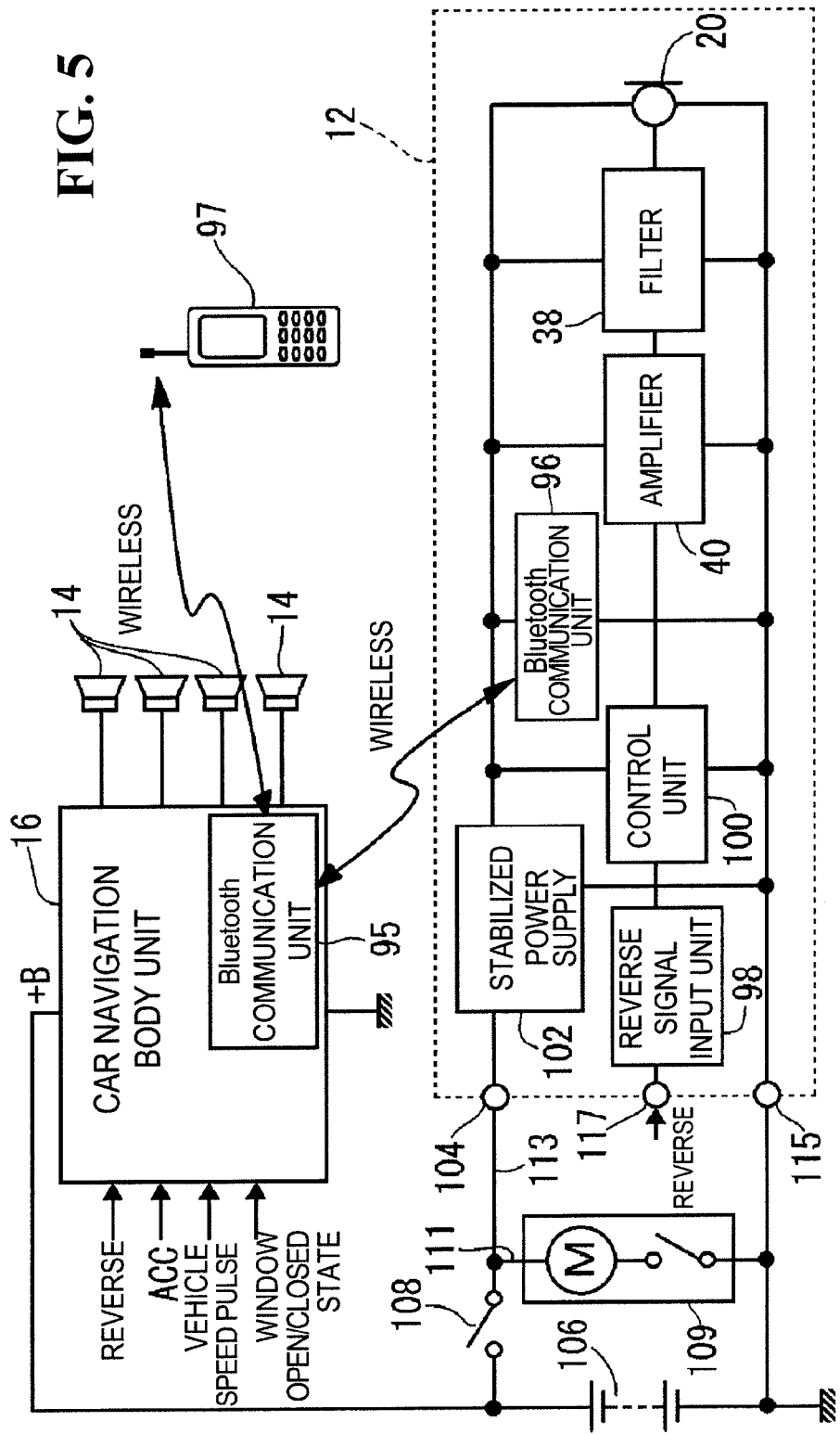
FIG. 5 is a block diagram illustrating a system configuration according to embodiment 2 of the present invention.

Although in the above-described embodiment, microphone-collected sound signals are transmitted via wires to the car navigation body unit 16, the microphone-collected sound signals can be transmitted wirelessly. In this case, where the car navigation body unit 16 is provided with a Bluetooth hands-free profile for hands-free telephone communications over a mobile phone, microphone-collected sound signals can be received wirelessly using this hands-free profile. FIG. 5 illustrates a system configuration according to an embodiment of the present invention, configured so that collected-sound signals from microphone devices 12 are wirelessly transmitted to a car navigation body unit 16 using a Bluetooth hands-free profile between the car navigation body unit 16 and the microphone devices 12 and reproduced via speaker devices 14. The car navigation body unit 16 has a configuration that is the same as that described in embodiment 1 (FIG. 1) except the car navigation body unit 16 includes a Bluetooth communication unit 95 for performing a Bluetooth communication using a hands-free profile, and incorporates a microphone for a hands-free telephone communication over a mobile phone therein or includes a microphone terminal for connecting an external microphone for performing the hands-free telephone communication. For speakers for reproducing voices from an opposite party of a hands-free telephone communication over a mobile phone, speakers 14 can be used, or a speaker can be incorporated in the car navigation body unit 16 or a dedicated external speaker can be connected to an external speaker connection terminal of the car navigation body unit 16 and used. The Bluetooth communication unit 95 is controlled by the computing unit 88 in FIG. 1. A mobile phone 97 and a microphone device 12 are provided with a Bluetooth communication function according to a hands-free profile. In the present embodiment, for example, it is possible that the car navigation body unit 16 is used in a master mode while the mobile phone 97 and the microphone device 12 are used in a slave mode. The microphone device 12 includes, e.g., a Bluetooth communication unit 96 for performing a Bluetooth communication according to the hands-free profile, a control unit 100 and a stabilized power supply 102, in addition to a microphone 20, a filter circuit 38 and an AGC-provided microphone amplifier IC 40 which are the same as those described in embodiment 1 (FIG. 3). For the microphone device 12, for example, one microphone device 12 is used and the microphone device 12 is installed at, for example, a rear portion of the vehicle. An ACC power supply or an ignition-on power supply (power supply that exhibits +12 V when the key position in an ignition key switch is an on position and exhibits 0 V when the key position is a position other than that position) is supplied to a power supply terminal 104 of the microphone device 12 from a battery 106 via the ignition key switch 108. If the microphone device 12 is provided at the rear portion of the vehicle, for example, the power supply terminal 104 of the microphone device 12 can be connected to an electric wire 111 of a rear windshield wiper drive device 109 supplied with the ignition-on power supply, via an electric wire 113. A ground terminal 115 of the microphone device 12 is grounded. In the car navigation body unit 16, the mobile phone 97 and the microphone device 12 are registered in advance as communication opposite parties. A communication between the car navigation body unit 16 and the mobile phone 97 and a communication between the car navigation body unit 16 and the microphone device 12 can be performed by forming respective SCO (synchronous connection-oriented) links. In the Bluetooth standards, a maximum of three SCO links can simultaneously be formed for one master in a piconet; however there may be cases where a plurality of SCO links cannot be formed because of a problem of, e.g., resources on the car navigation body unit 16 side. Therefore, in the present embodiment, on the assumption that a plurality of SCO links cannot be formed simultaneously, a single SCO link is formed between the car navigation body unit 16 and the mobile phone 97 and between the car navigation body unit 16 and the microphone device 12 alternately. In other words, the car navigation body unit 16 can alternatively perform a Bluetooth communication according to a hands-free profile with the mobile phone 97 or the microphone device 12. The Bluetooth communication between the car navigation body unit 16 and the mobile phone 97 is performed between the Bluetooth communication unit 95 in the car navigation body unit 16 and a Bluetooth communication unit (not illustrated) in the mobile phone 97, whereby, e.g., transmission/reception of telephone communication sound signals between the car navigation body unit 16 and the mobile phone 97 and remote operations of the mobile phone 97 from the car navigation body unit 16 are performed. The Bluetooth communication between the car navigation body unit 16 and the microphone device 12 is performed between the Bluetooth communication units 95 and 96, whereby a collected sound signal from the microphone device 12 is transmitted to the car navigation body unit 16 that functions as a receiver. The Bluetooth communications are encrypted wireless communications, and thus, the collected-sound signal from the microphone device 12 can be transmitted to the car navigation body unit 16 without interference by signals from other wireless devices. The microphone device 12 consistently collect sounds, and when an SCO link is formed between the car navigation body unit 16 and the microphone device 12 in response to an instruction from the car navigation body unit 16 and an HFP (hands-free profile) connection request is issued from the car navigation body unit, a collected-sound signal is wirelessly transmitted to the car navigation body unit 16, and when the HFP connection is disconnected, the transmission is ended. The computing unit 88 (FIG. 1) in the car navigation body unit 16 receives a microphone-collected sound signal from the microphone device 12 and reproduces the microphone-collected sound signal on condition that no hands-free telephone communication is underway. Also, the computing unit 88 permits a hands-free telephone communication on condition that no reproduction of a microphone-collected sound signal is underway. As described above, a Bluetooth hands-free profile for performing a hands-free telephone communication over a mobile phone, which is provided to the car navigation body unit 16, is used also for wireless transmission of a microphone-collected sound signal, eliminating the need for a signal wire for transmitting a microphone-collected sound signal to the car navigation body unit 16. In particular, where a microphone device 12 is arranged at a rear portion of a vehicle as in this example, the distance from the microphone device 12 to a car navigation body unit 16 is long and thus, if wire connection is employed, the wire becomes long. Accordingly, large effects (e.g., reduction in weight of the vehicle due to omission of wires and reduction in cost for attachment due to omission of wire laying work) can be provided by employment of wireless connection.

Figure 6:
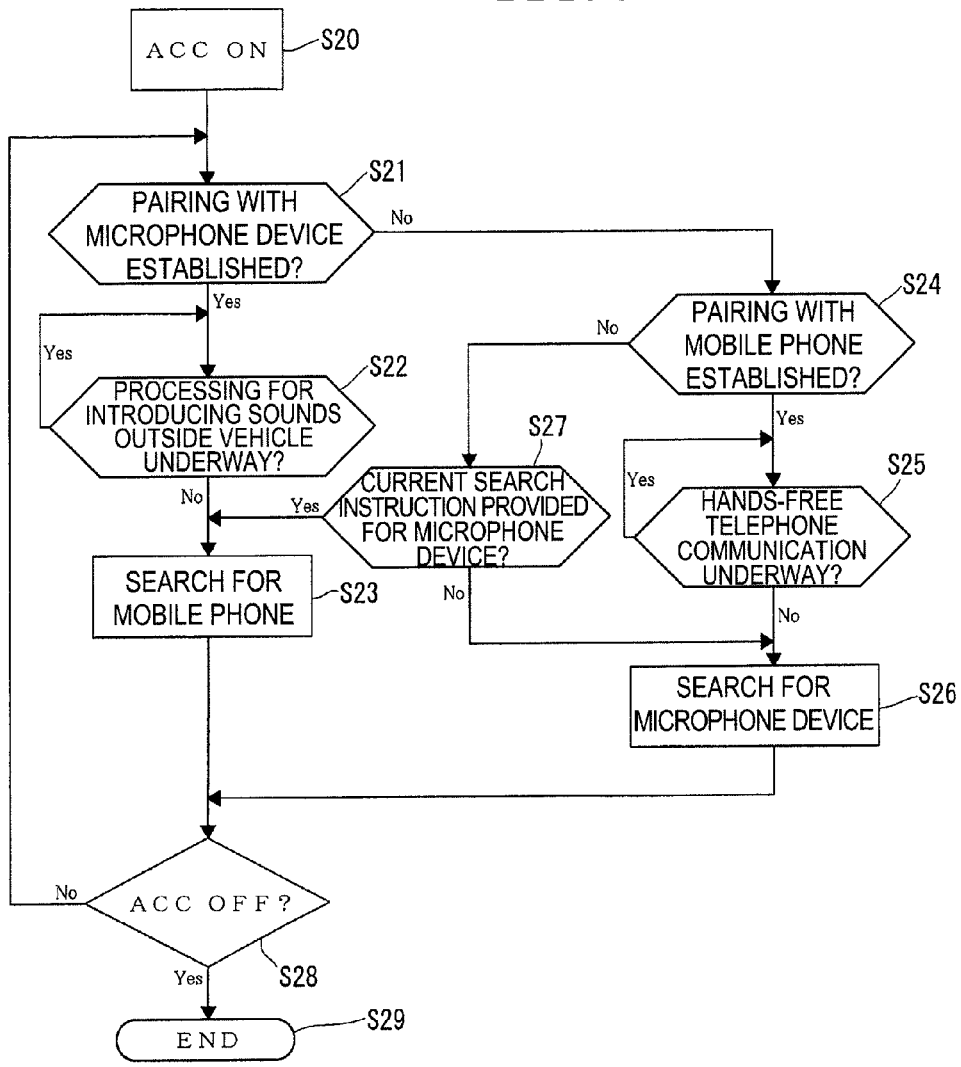
FIG. 6 is a flowchart illustrating an example of control of switching between wireless connection between a car navigation body unit 16 and a mobile phone 97 and wireless connection between the car navigation body unit 16 and a microphone device 12 by a computing unit 88 in the car navigation body unit 16 in FIG. 5.

FIG. 6 illustrates an example of control for forming a single SCO link between the car navigation body unit 16 and the mobile phone 97, and between the car navigation body unit 16 and the microphone device 12 alternately (alternately switching between pairings), which is performed by the computing unit 88 (FIG. 1) in the car navigation body unit 16. It is assumed that in the Bluetooth communication unit 95 in the car navigation body unit 16, the mobile phone 97 and the microphone device 12 are already registered as opposite party devices for performing Bluetooth communications. The control illustrated in FIG. 6 is repeatedly performed during the ACC power supply being on, and establishment of a pairing between the car navigation body unit 16 and the mobile phone 97 and establishment of a pairing between the car navigation body unit 16 and the microphone device 12 are alternately tried. When a pairing between the car navigation body unit 16 and the mobile phone 97 is established and an SCO link is formed, an HFP connection request is issued from the car navigation body unit 16 to the mobile phone 97. Upon receipt of the HFP connection request, if an operation to make a hands-free call is performed or a call is received in a hands-free manner at the time, the mobile phone 97 establishes an HFP connection with the car navigation body unit 16 to perform a hands-free telephone communication. The HFP connection is continued until the hands-free telephone communication is terminated. Upon the end of the hands-free telephone communication, the alternate pairing establishment trials are conducted again. When a pairing between the car navigation body unit 16 and the microphone device 12 is established, and an SCO link is formed, if the then-current input source of the car navigation body unit 16 has been switched to a microphone-collected sound signal, an HFP connection request is issued from the car navigation body unit 16 to the microphone device 12. Upon receipt of the HFP connection request, the microphone device 12 establishes an HFP connection with the car navigation body unit 16, and transmits the microphone-collected sound signal to the car navigation body unit 16. The HFP connection is continued until reproduction of microphone-collected sounds is ended. Upon the end of reproduction of the microphone-collected signal, alternate pairing establishment trials are conducted again.

The control in FIG. 6 will be described. When the key position in the ignition key switch is switched from an off position to an ACC position or the on position, thereby the ACC power supply being turned on (S20), the control in FIG. 6 is started. At the beginning of the start of the control, neither a pairing with the mobile phone 97 nor a pairing with the microphone device 12 is established ("NO" in S21 and "NO" in S24), and thus, an instruction to search for the microphone device 12 is provided (S26 through "NO" in S27). If a pairing with the microphone device 12 is established within a set period of time from the provision of the instruction to search for the microphone device 12 (period of time sufficient for establishing a pairing) ("YES" in S21 through "NO" in S28), whether or not an instruction to switch the input source to a microphone-collected sound signal (corresponding to S6 in FIG. 4) is provided is determined (S22), and if no such switching instruction is provided ("NO" in S22), the pairing with the microphone device 12 is canceled, and then, an instruction for searching for the mobile phone 97 is provided (S23). If a pairing with the mobile phone 97 is established within a set period of time from the provision of the instruction for searching for the mobile phone 97, the set period of time being set to, for example, have a length of time equal to the set period of time for searching for the microphone device 12 ("YES" in S24 through "NO" in S28 and "NO" in S21), whether or not an operation to make a hands-free call is performed or a hands-free call is received is determined (S25), if no such operation is performed and no such call is received ("NO" in S25), the pairing with the mobile phone 97 is canceled, and an instruction for searching for the microphone device 12 is provided (S26). Subsequently, the alternate searching is repeated at a fixed cycle (cycle that is substantially equal to the aforementioned set period of time) until an instruction for switching to a microphone-collected sound signal is provided (corresponding to S6 in FIG. 4), or an operation to make a hands-free call is performed or a call is received in a hands-free manner.

When a pairing with the microphone device 12 is established ("YES" in S21), if an instruction for switching to a microphone-collected sound signal is provided (corresponding to S6 in FIG. 4) ("YES" in S22), a collected sound signal transmitted from the microphone device 12 is received and reproduced via the speaker devices 14. The reproduction of the microphone-collected sound signal is continued until an instruction for terminating the reproduction of the microphone-collected sound signal (corresponding to S12 in FIG. 4) is provided (repetition of "YES" in S22). Upon the end of the reproduction of the microphone-collected sound signal ("NO" in S22), an instruction for searching for the mobile phone 97 is provided (S23), and subsequently, the alternate search is repeated until an instruction for switching to a microphone-collected sound signal is provided, or an operation to make a hands-free call is performed or a call is received in a hands-free manner.

When a pairing with the mobile phone 97 is established ("YES" in S24), if an operation to make a hands-free call is performed or a call is received in a hands-free manner ("YES" in S25), the hands-free telephone communication is permitted. The hands-free telephone communication is continued until the hands-free telephone communication is terminated (repetition of "YES" in S25). Upon the end of the hands-free telephone communication ("NO" in S25), an instruction for searching for the microphone 12 is provided (S26), and subsequently, the alternate search is repeated until an instruction for switching to a microphone-collected sound signal is provided, or an operation to make a hands-free call is performed or a call is received in a hands-free manner.

When the mobile phone 97 is not carried or the power supply of the mobile phone 97 is not on, even if an instruction for searching for the mobile phone 97 is provided (S23), a pairing with the mobile phone 97 is not established within the set period of time ("NO" in S24), the instruction is switched to an instruction for searching for the microphone device 12 (S26 through "NO" in S27). Also, even though an instruction for searching for the microphone device 12 (S26) is provided, if a paring with the microphone device 12 is not established within the set period of time ("NO" in S21) because of, e.g., a failure of the microphone device 12, the instruction is switched to an instruction for searching for the mobile phone 97 (S23 through "NO" in S24 and "YES" in S27). When the key position in the ignition key switch is switched to the off position ("YES" in S28), the control is ended (S29).

Although in the above description, a timing for wireless transmission of sounds outside the vehicle from the microphone device 12 to the car navigation body unit 16 is determined on the car navigation body unit 16 side, if sounds outside the vehicle are transmitted from the microphone device 12 to the car navigation body unit 16 only when the gear position is a reverse driving position, the transmission timing can be determined on the microphone device 12 side. In such case, as illustrated in FIG. 5, a reverse signal input terminal 117 is provided in the microphone device 12 to input a reverse signal thereto. The reverse signal can be extracted from a drive wire for backup lamps. Upon input of a reverse signal, a control unit 100 provides an instruction to the Bluetooth communication unit 96 to transmit the microphone-collected sound signal. Upon receipt of the instruction, the Bluetooth communication unit 96 performs processing for establishing a pairing with the Bluetooth communication unit 95 in the car navigation body unit 16. The Bluetooth communication unit 95 in the car navigation body unit 16 has a function that simultaneously waits for a pairing request from the mobile phone 97 and a pairing request from the microphone device 12. If the gear position is shifted to the reverse driving position in such simultaneous wait state and a pairing request is provided from the microphone device 12, the Bluetooth communication unit 95 in the car navigation body unit 16 performs processing for establishing a pairing with the microphone device 12 and forming an SCO link to establish an HFP connection, in response to the request. Upon establishment of the HFP connection, the microphone device 12 wirelessly transmits a microphone-collected sound signal to the car navigation body unit 16. The HFP connection is maintained until the transmission of the microphone-collected sound signal is terminated on the microphone device 12 side. When the gear position is shifted from the reverse driving position to another position, the microphone device 12 cancels the HFP connection. In response to the cancellation, the car navigation body unit 16 terminates the reception of the microphone-collected sound signal and cancels the pairing with the microphone device 12, and returns to the simultaneous wait state. In the simultaneous wait state, if the mobile phone 97 receives a call and a pairing request is provided from the mobile phone 97, the Bluetooth communication unit 95 in the car navigation body unit 16 performs processing for establishing a pairing with the mobile phone 97 and forming an SCO link to establish an HFP connection, in response to the request. Upon establishment of the HFP connection, a hands-free telephone communication is performed over the mobile phone 97. The HFP connection is maintained until the hands-free telephone communication is terminated. Upon the end of the hands-free telephone communication, the car navigation body unit 16 cancels the HFP connection and returns to the simultaneous wait state. In the simultaneous wait state, if an operation to make a call is performed on the car navigation body unit 16, the Bluetooth communication unit 95 in the car navigation body unit 16 performs processing for establishing a pairing with the mobile phone 97 and forming an SCO link to establish an HFP connection. Upon establishment of the HFP connection, a hands-free telephone communication is performed over the mobile phone 97. The HFP telephone connection is maintained until the hands-free telephone communication is terminated. Upon the end of the hands-free telephone communication, the car navigation body unit 16 cancels the HFP connection and returns to the simultaneous wait state.

Variations and Applications

Although in the above embodiments, whether or not the gear position is a reverse driving position is determined depending on existence or non-existence of a reverses signal, whether or not the gear position is a reverse driving position can be determined based on the fact that none of signals indicating a gear position other than the reverse driving position is detected, instead of direct detection of existence or non-existence of a reverse signal. Furthermore, although in the above embodiments, regarding the gear position, sounds outside the vehicle are reproduced only when the gear position is a reverse driving position, arrangement can be made so that sounds outside the vehicle are reproduced also in the case of any one or both of a parking position or a neutral position. Also, although the above embodiments have been described in terms of a case where the present invention is combined with a car navigation device, the present invention can be combined with a car audio system having no car navigation function. Furthermore, although in the above-described example using Bluetooth wireless communications in embodiment 2, a single SCO link is formed between a car navigation device and a mobile phone and between the car navigation device and a microphone device alternately, if a plurality of SCO links can simultaneously be formed, SCO links are formed between a car navigation device and a mobile phone, and between the car navigation device and a microphone device, respectively, and the two SCO links can be used without switching. Furthermore, although the above embodiments have been described in terms of a case where the present invention is applied to a passenger vehicle (FIG. 2), the present invention provides a larger effect in safety enhancement where the present invention is applied to a large-size vehicle such as a truck with poor visibility around the vehicle.

DESCRIPTION OF SYMBOLS

10 . . . vehicle, 12 . . . microphone device, 14 . . . speaker device, 16 . . . body unit of car navigation device (device including a sound reproduction system), 18 . . . sound reproduction system, 40 . . . microphone amplifier having automatic gain control function, 88 . . . computing unit (sound reproduction control device)

What is claimed is:
1. A system for introducing a sound outside a vehicle, the system comprising:
   a microphone device installed outside an interior of the vehicle, the microphone device collecting the sound outside the vehicle;
   a speaker device installed inside the interior of the vehicle;
   a sound reproduction system that reproduces the sound collected by the microphone device, via the speaker device; and
   a sound reproduction control device that receives an input of a signal indicating a gear position currently selected for the vehicle, and controls the sound reproduction system so that if the gear position is a reverse driving position, the sound collected by the microphone device is reproduced via the speaker device, and if the gear position is a forward driving position, the reproduction of the sound collected by the microphone device is stopped or a volume of the sound reproduced is reduced to be smaller than that for reverse driving.

2. The system for introducing a sound outside a vehicle according to claim 1, wherein the sound reproduction control device further receives an input of a key position signal indicating a key position in an ignition key switch in the vehicle and an input of a vehicle speed signal indicating a vehicle speed of the vehicle, and performs the control of the sound reproduction system so that until the vehicle speed reaches a predetermined speed for a first time after the key position in the ignition key switch is switched from an off position to an accessories position or an on position, the sound collected by the microphone device is reproduced via the speaker device even if the gear position is the forward driving position, and if the vehicle speed reaches the predetermined speed, the reproduction of the sound is stopped or the volume of the sound reproduced is reduced to be smaller than that before the vehicle speed reaches the predetermined speed for the first time, and even if the vehicle speed is subsequently decreased to be lower than the predetermined speed, the stoppage of the reproduction of the sound or the reduced volume of the sound reproduced is maintained.

3. The system for introducing a sound outside a vehicle according to claim 1,
wherein the gear position signal is a reverse signal indicating that the gear position is the reverse driving position; and
wherein when the reverse signal is not input, the sound reproduction control device performs the control for a case where the gear position is the forward driving position.

4. The system for introducing a sound outside a vehicle according to claim 2,
wherein the gear position signal is a reverse signal indicating that the gear position is the reverse driving position; and
wherein when the reverse signal is not input, the sound reproduction control device performs the control for a case where the gear position is the forward driving position.

5. A system for introducing a sound outside a vehicle, the system comprising:
a microphone device installed outside an interior of the vehicle, the microphone device collecting the sound outside the vehicle;
a speaker device installed inside the interior of the vehicle;
a sound reproduction system that reproduces the sound collected by the microphone device, via the speaker device; and
a sound reproduction control device that receives an input of a key position signal indicating a key position in an ignition key switch in the vehicle and an input of a vehicle speed signal indicating a vehicle speed of the vehicle, and performs control of the sound reproduction system so that until the vehicle speed reaches a predetermined speed for a first time after the key position in the ignition key switch is switched from an off position to an accessories position or an on position, the sound collected by the microphone device is reproduced via the speaker device, and if the vehicle speed reaches the predetermined speed, the reproduction of the sound is stopped or a volume of the sound reproduced is reduced to be smaller than that before the vehicle speed reaches the predetermined speed for the first time, and even if the vehicle speed is subsequently decreased to be lower than the predetermined speed, the stoppage of the reproduction of the sound or the reduced volume of the sound reproduced is maintained.

6. The system for introducing a sound outside a vehicle according to claim 1,
wherein the sound reproduction system is used also as a sound reproduction system for a car audio system or a car navigation device; and
wherein the sound reproduction control device performs the control of the sound reproduction system so that when the sound collected by the microphone device is reproduced via the speaker device, reproduction of a sound from a sound source other than the sound outside the vehicle is stopped or a volume of the sound reproduced from the sound source other than the sound outside the vehicle is reduced.

7. The system for introducing a sound outside a vehicle according to claim 5,
wherein the sound reproduction system is used also as a sound reproduction system for a car audio system or a car navigation device; and
wherein the sound reproduction control device performs the control of the sound reproduction system so that when the sound collected by the microphone device is reproduced via the speaker device, reproduction of a sound from a sound source other than the sound outside the vehicle is stopped or a volume of the sound reproduced from the sound source other than the sound outside the vehicle is reduced.

8. The system for introducing a sound outside a vehicle according to claim 6,
wherein the microphone device includes a microphone amplifier having an automatic gain control function; and
wherein the sound reproduction control device performs the control of the sound reproduction system so that when the sound collected by the microphone device is reproduced via the speaker device, a signal of the sound output from the microphone amplifier is reproduced at a volume setting value determined in advance irrespective of a state of volume adjustment for the car audio system or the car navigation device immediately before the reproduction of the sound.

9. The system for introducing a sound outside a vehicle according to claim 7,
wherein the microphone device includes a microphone amplifier having an automatic gain control function; and
wherein the sound reproduction control device performs the control of the sound reproduction system so that when the sound collected by the microphone device is reproduced via the speaker device, a signal of the sound output from the microphone amplifier is reproduced at a volume setting value determined in advance irrespective of a state of volume adjustment for the car audio system or the car navigation device immediately before the reproduction of the sound.

10. The system for introducing a sound outside a vehicle according to claim 1, wherein the sound reproduction control device further receives an input of a window open/closed state signal indicating an open/closed state of a window of the vehicle, and performs the control of the sound reproduction system so that when the sound collected by the microphone device is reproduced via the speaker device, if the window of the vehicle is open, the sound is reproduced at a volume reduced compared to that for a case where the window is closed.

11. The system for introducing a sound outside a vehicle according to claim 5, wherein the sound reproduction control device further receives an input of a window open/closed state signal indicating an open/closed state of a window of the vehicle, and performs the control of the sound reproduction system so that when the sound collected by the microphone device is reproduced via the speaker device, if the window of the vehicle is open, the sound is reproduced at a volume reduced compared to that for a case where the window is closed.

12. The system for introducing a sound outside a vehicle according to claim 1, wherein the microphone device transmits a collected-sound signal from the microphone device to a device including the sound reproduction system, using wireless communication according to a Bluetooth (registered trademark) hands-free profile.

13. The system for introducing a sound outside a vehicle according to claim 5, wherein the microphone device transmits a collected-sound signal from the microphone device to a device including the sound reproduction system, using wireless communication according to a Bluetooth (registered trademark) hands-free profile.

14. The system for introducing a sound outside a vehicle according to claim 12, wherein the device including the sound reproduction system is a car navigation device, and the car navigation device forms a single SCO link with a mobile phone and the microphone device alternately switched.

15. The system for introducing a sound outside a vehicle according to claim 13, wherein the device including the sound reproduction system is a car navigation device, and the car navigation device forms a single SCO link with a mobile phone and the microphone device alternately switched.

16. The system for introducing a sound outside a vehicle according to claim 14, wherein the car navigation device, when a hands-free telephone communication with the mobile phone is performed, maintains the SCO link with the mobile phone until the end of the hands-free telephone communication, when a collected-sound signal is received from the microphone device, maintains the SCO link with the microphone device until the end of the reception of the collected-sound signal, and when neither the hands-free telephone communication nor the reception of the collected-sound signal is performed, periodically performs the alternate SCO link switching.

17. The system for introducing a sound outside a vehicle according to claim 15, wherein the car navigation device, when a hands-free telephone communication with the mobile phone is performed, maintains the SCO link with the mobile phone until the end of the hands-free telephone communication, when a collected-sound signal is received from the microphone device, maintains the SCO link with the microphone device until the end of the reception of the collected-sound signal, and when neither the hands-free telephone communication nor the reception of the collected-sound signal is performed, periodically performs the alternate SCO link switching.

* * * * *